US012111675B1

(12) United States Patent
Can

(10) Patent No.: US 12,111,675 B1
(45) Date of Patent: Oct. 8, 2024

(54) CURVATURE-CORRECTED BANDGAP REFERENCE

(71) Applicant: ITU472, LLC, Cardiff-by-the-Sea, CA (US)

(72) Inventor: Sumer Can, Milford, CT (US)

(73) Assignee: ITU472, LLC, Cardiff-by-the-Sea, CA (US)

( * ) Notice: Subject to any disclaimer, the term of this patent is extended or adjusted under 35 U.S.C. 154(b) by 0 days.

(21) Appl. No.: 18/630,792

(22) Filed: Apr. 9, 2024

(51) Int. Cl.
*G05F 3/26* (2006.01)

(52) U.S. Cl.
CPC .............. *G05F 3/262* (2013.01); *G05F 3/267* (2013.01)

(58) Field of Classification Search
CPC ................................. G05F 3/262; G05F 3/267
See application file for complete search history.

(56) References Cited

U.S. PATENT DOCUMENTS 5,933,045 A * 8/1999 Audy ........................ G05F 3/30 327/513
6,965,266 B1 * 11/2005 Can ..................... H03F 3/45121 330/252
7,248,098 B1 * 7/2007 Teo ........................... G05F 3/30 327/539
7,276,890 B1 * 10/2007 Kumar ...................... G05F 3/30 327/539
7,728,575 B1 * 6/2010 Ozalevli ................... G05F 3/30 327/513
8,222,955 B2 * 7/2012 Duval ....................... G05F 3/30 327/539
9,780,652 B1 * 10/2017 Far ........................ H02M 3/158
10,290,330 B1 * 5/2019 Kamath ................. G01K 7/015
10,359,801 B1 * 7/2019 Chen .......................... G05F 3/30
10,642,304 B1 * 5/2020 Shreepathi Bhat ..... G05F 3/225
11,526,189 B2 * 12/2022 Huang .................... G05F 3/262
2007/0273352 A1 * 11/2007 Lee ........................... G05F 3/30 323/315
2008/0297130 A1 * 12/2008 Peng .......................... G05F 3/30 323/313
2009/0108918 A1 * 4/2009 Chellappa ................. G05F 3/30 327/539

(Continued)

OTHER PUBLICATIONS

Yannis P. Tsividis, “Accurate Analysis of Temperature Effects in IC-VBE Characteristics with Application to Bandgap Reference Sources”, IEEE Journal of Solid-State Circuits, vol. SC-15, No. 6, Dec. 1980, pp. 1076-1084.

(Continued)

*Primary Examiner* — Yusef A Ahmed
(74) *Attorney, Agent, or Firm* — André Grouwstra

(57) ABSTRACT

A reference circuit generates a reference circuit output signal that has a curvature-corrected linear dependence on the temperature. It includes a first reference circuit, with a first output signal that is based on a base-emitter voltage of a bipolar junction transistor (BJT) and a second reference circuit, with a second output signal that is based on a gate-source voltage of a metal-oxide-semiconductor (MOS) transistor operating in weak inversion mode. It has an output circuit that adds the first output signal and the second output signal to obtain the reference circuit output signal.
The reference circuit output signal may be a current or a voltage. It may be independent of the temperature, or have a positive or negative temperature coefficient.

8 Claims, 10 Drawing Sheets

Voltage reference

(56) References Cited

U.S. PATENT DOCUMENTS

| | | | | |
|---|---|---|---|---|
| 2009/0110027 | A1* | 4/2009 | Chellappa | G01K 7/01 374/163 |
| 2009/0146730 | A1* | 6/2009 | Chen | G05F 3/30 327/539 |
| 2010/0148857 | A1* | 6/2010 | Chellappa | G05F 3/242 327/538 |
| 2013/0241523 | A1* | 9/2013 | Youssefi | G05F 3/30 323/313 |
| 2014/0070873 | A1* | 3/2014 | Gunther | G05F 3/30 327/512 |
| 2014/0117966 | A1* | 5/2014 | Shaeffer | G05F 3/02 323/313 |
| 2014/0159700 | A1* | 6/2014 | Cho | G05F 3/16 323/313 |
| 2015/0002130 | A1* | 1/2015 | Kumar | G05F 3/30 323/313 |
| 2015/0145487 | A1* | 5/2015 | Fort | G05F 1/468 323/265 |
| 2015/0153753 | A1* | 6/2015 | Fort | G05F 1/625 323/282 |
| 2015/0338872 | A1* | 11/2015 | Afzal | G05F 3/02 323/313 |
| 2016/0238464 | A1* | 8/2016 | Eberlein | G01K 15/005 |
| 2017/0131736 | A1* | 5/2017 | Acar | G05F 3/267 |
| 2017/0139435 | A1* | 5/2017 | Arnold | G05F 3/16 |
| 2017/0255220 | A1* | 9/2017 | Sivakumar | H03B 5/04 |
| 2018/0210480 | A1* | 7/2018 | Sone | G05F 3/267 |
| 2019/0101948 | A1* | 4/2019 | Eberlein | G05F 3/225 |
| 2020/0192414 | A1* | 6/2020 | Mouret | G05F 3/267 |
| 2020/0233445 | A1* | 7/2020 | Mouret | G05F 1/462 |
| 2021/0004031 | A1* | 1/2021 | Cavallaro | G05F 1/575 |
| 2022/0283601 | A1* | 9/2022 | Kundu | G05F 3/242 |
| 2023/0139284 | A1* | 5/2023 | Krishnan | G05F 3/265 323/313 |
| 2023/0367350 | A1* | 11/2023 | Lee | G05F 3/225 |
| 2023/0393603 | A1* | 12/2023 | Kok Keong Lum | G05F 3/30 |
| 2024/0103558 | A1* | 3/2024 | Gangula | G05F 3/265 |

OTHER PUBLICATIONS

Dalton Colombo et al., “Curvature Correction Method Based on Subthreshold Currents for Bandgap Voltage References”, 2012 IEEE 3rd Latin American Symposium on Circuits and Systems (LASCAS), Feb. 29, 2012-Mar. 2, 2012, IEEE, Playa del Carmen, Mexico.

Luis H.C. Ferreira et al., “A CMOS threshold voltage reference source for very-low-voltage applications”, Microelectronics Journal 39 (2008), pp. 1867-1873, Mar. 20, 2008, Elsevier.

* cited by examiner

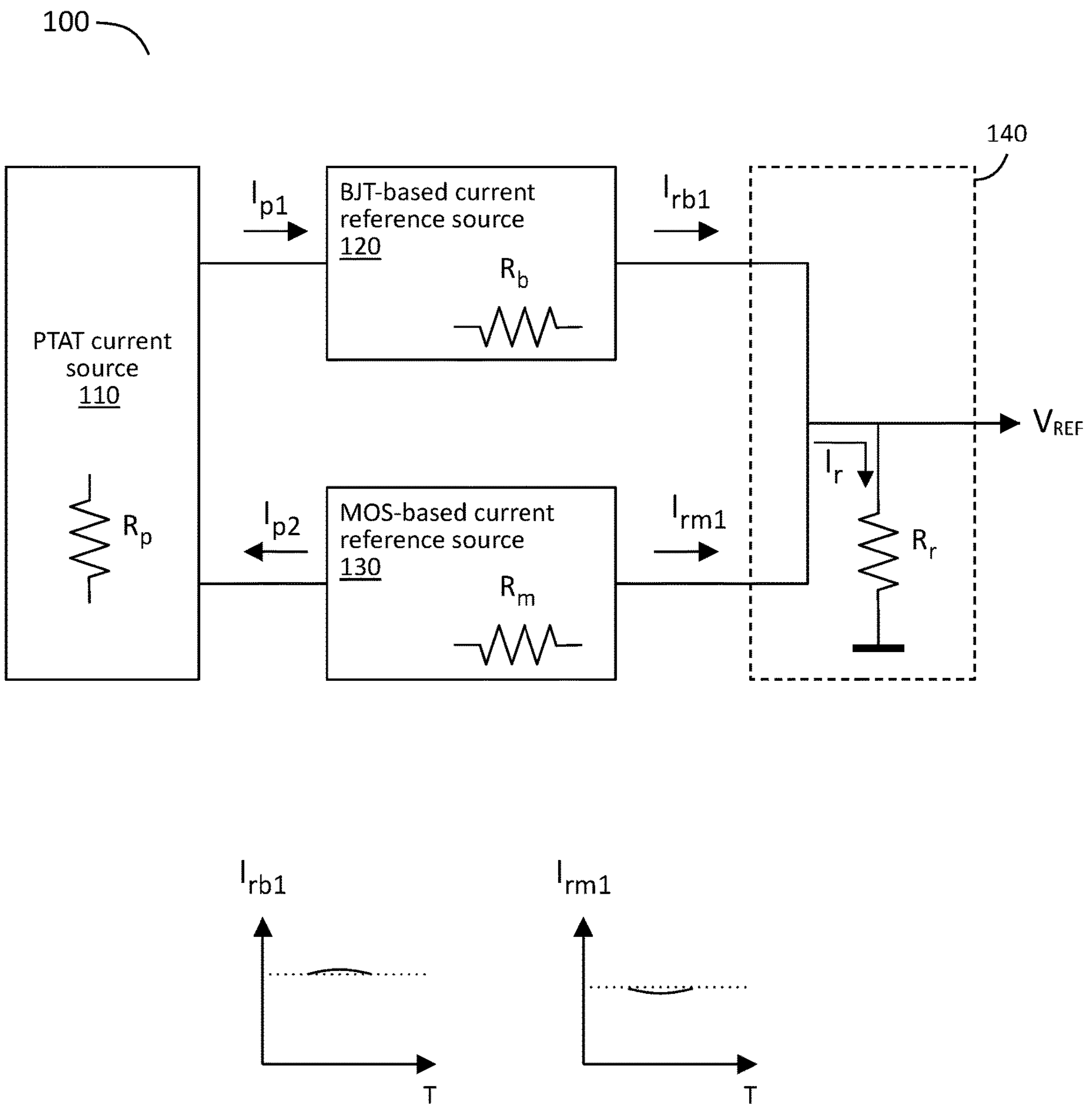
FIG. 1 – Voltage reference

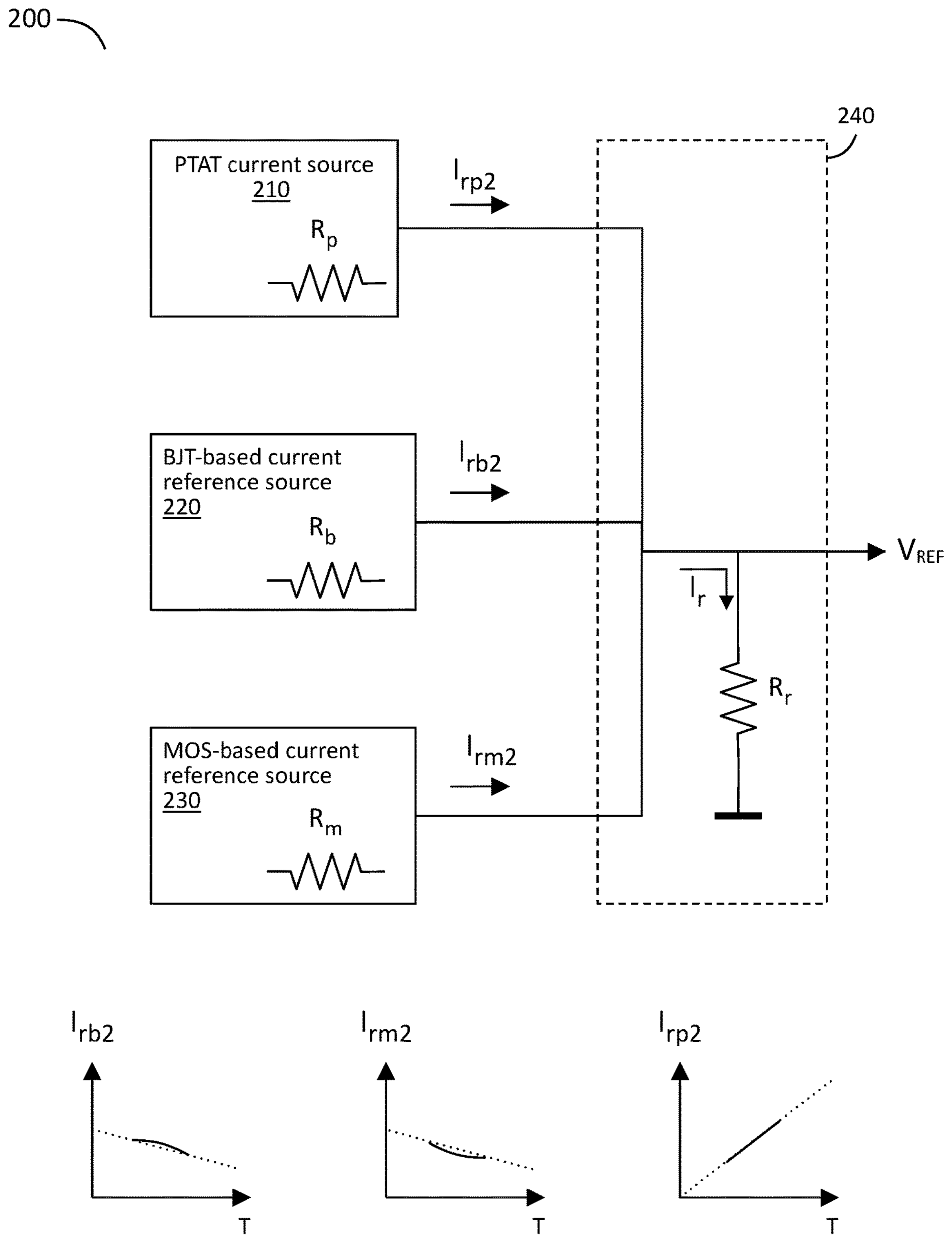
FIG. 2 – Voltage reference—alternative architecture

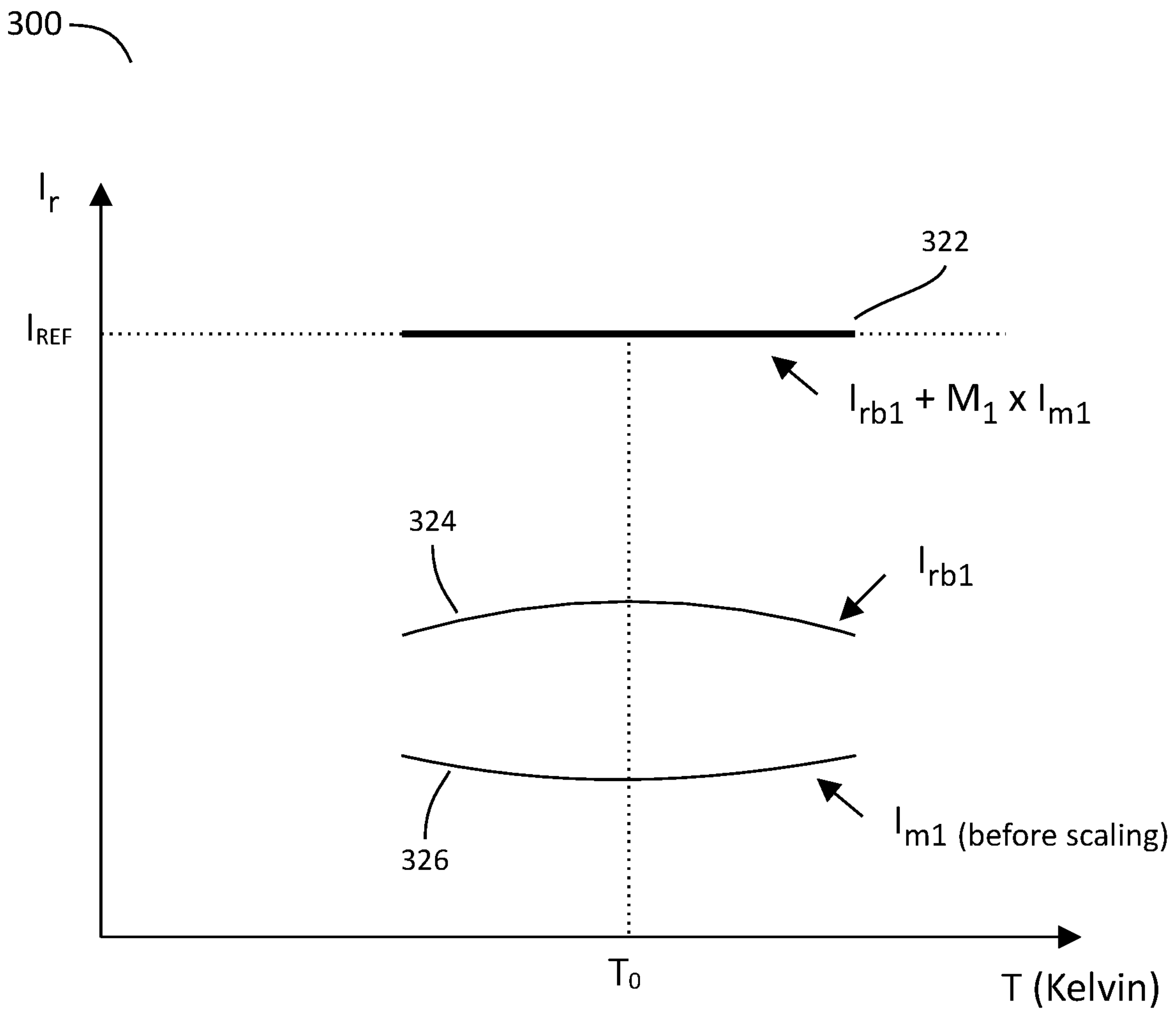
FIG. 3 – Currents versus temperature

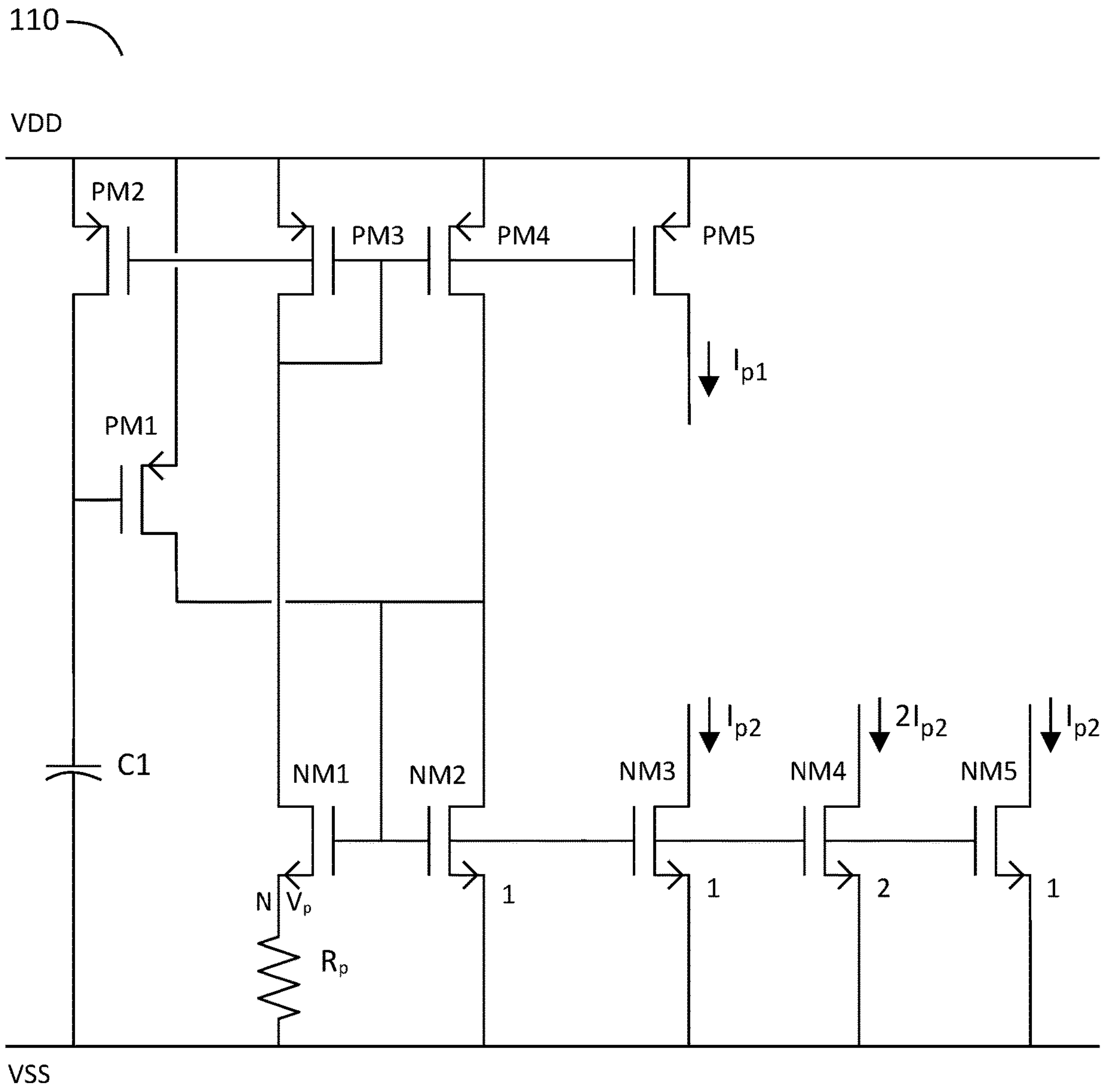
FIG. 4 – PTAT current generator

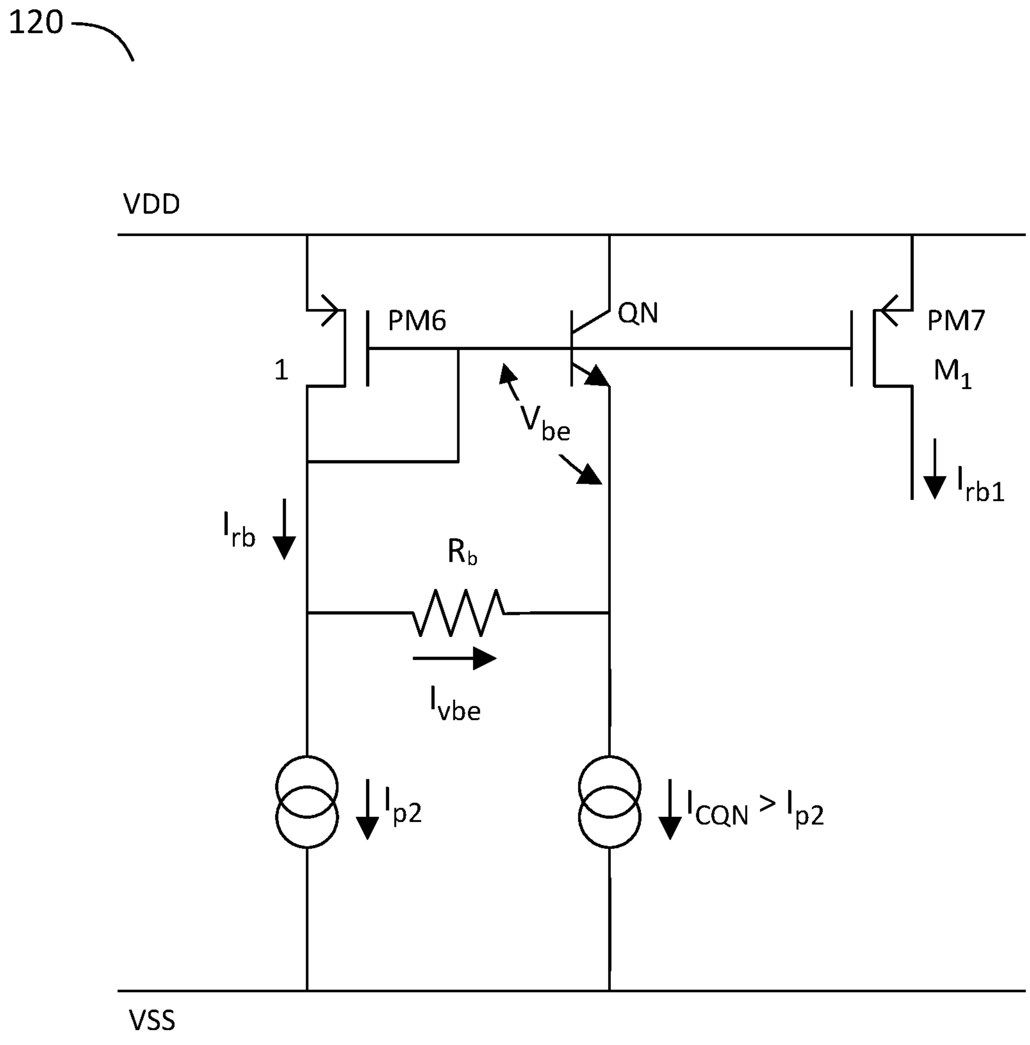
FIG. 5 – N-type BJT-based current reference source

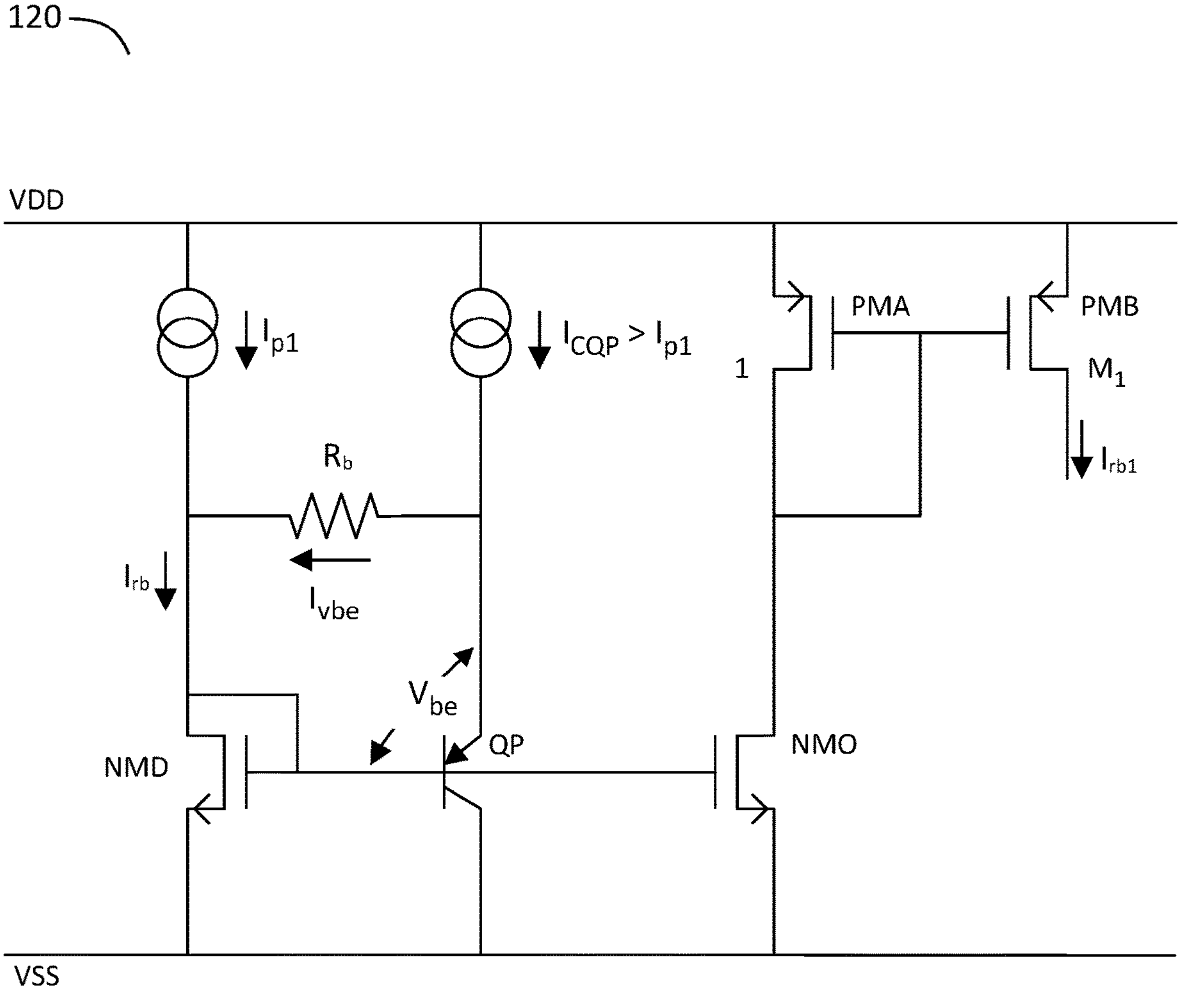
FIG. 6 – P-type BJT-based current reference source

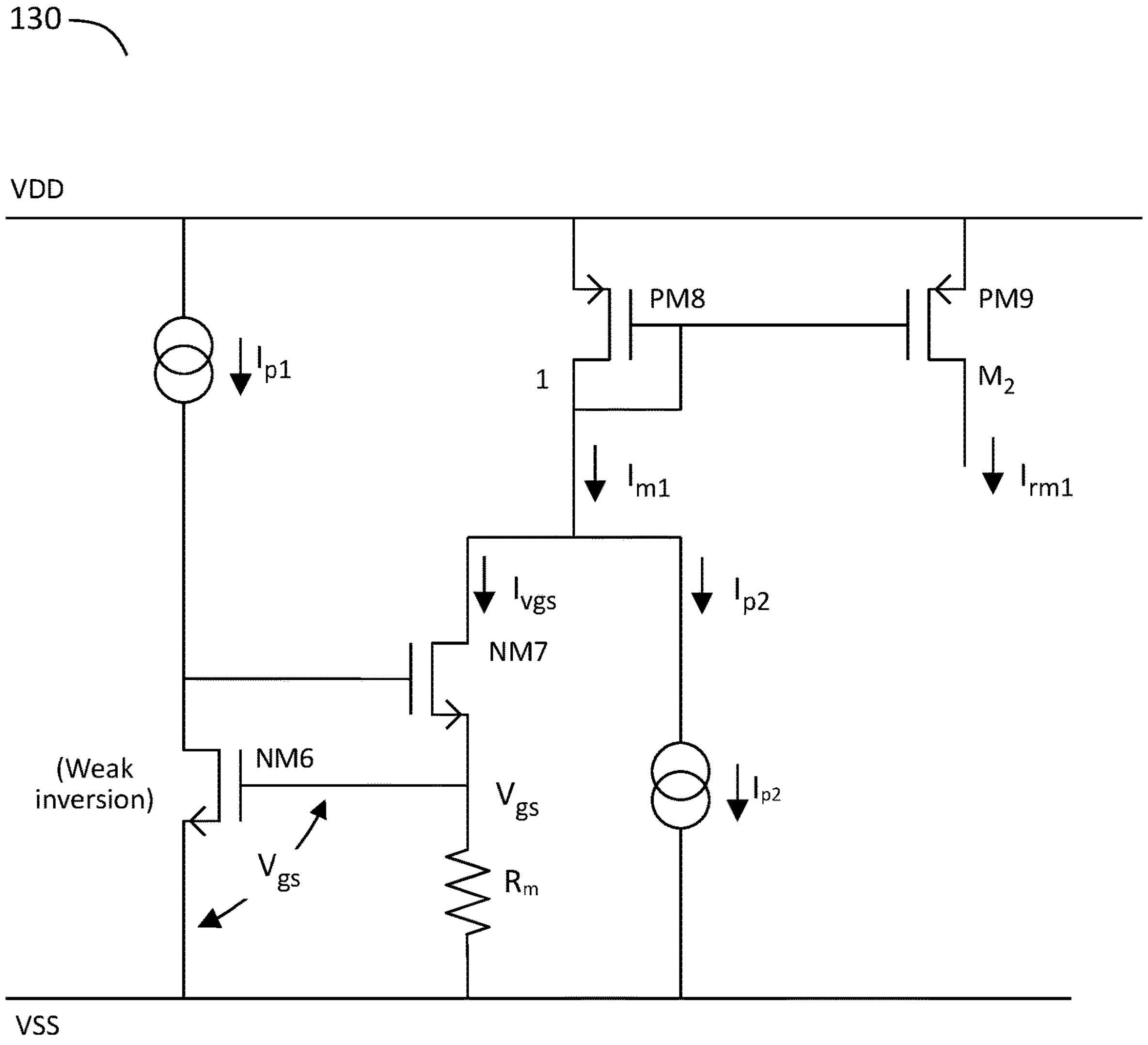
FIG. 7 – MOS-based current reference source

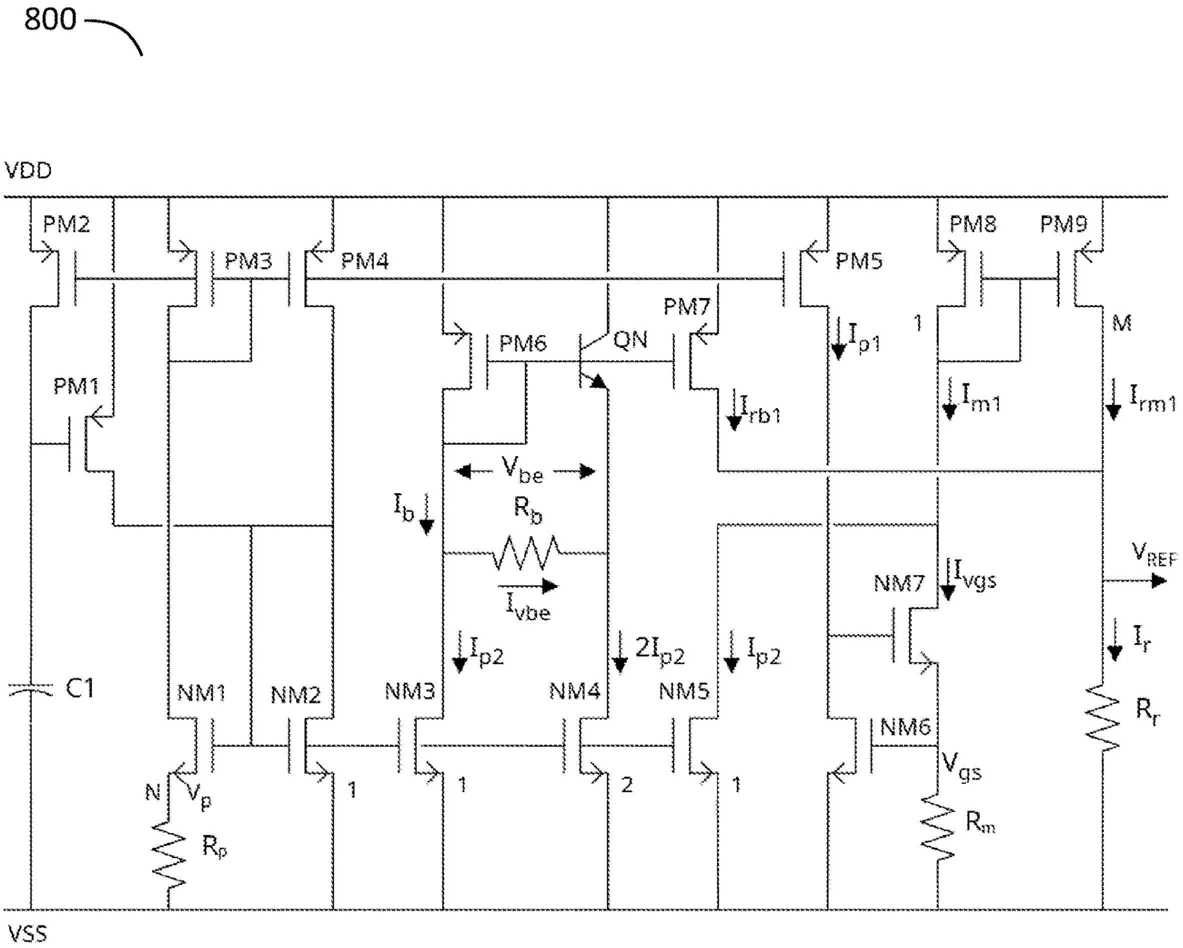
FIG. 8 – Voltage reference

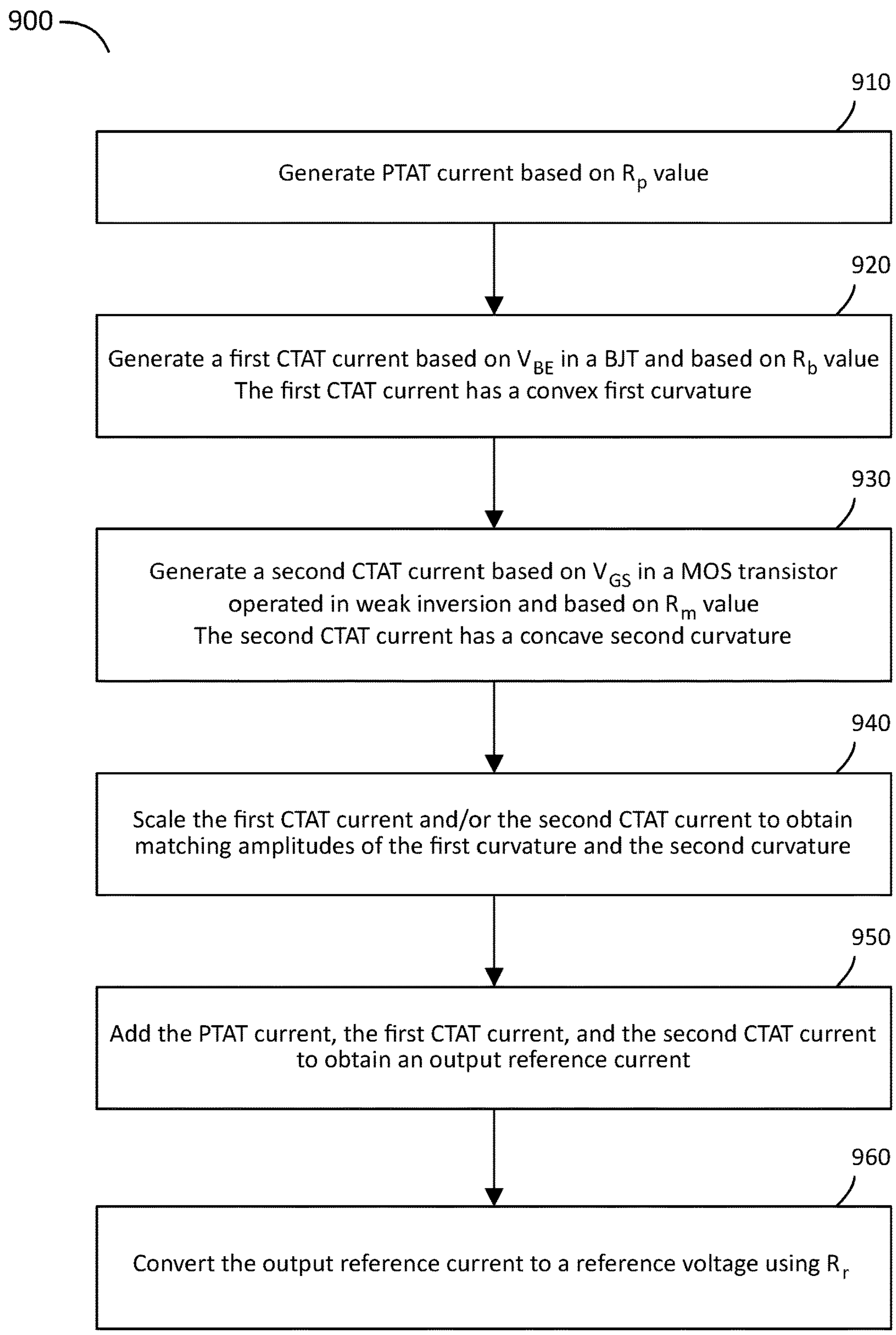
FIG. 9 – Method

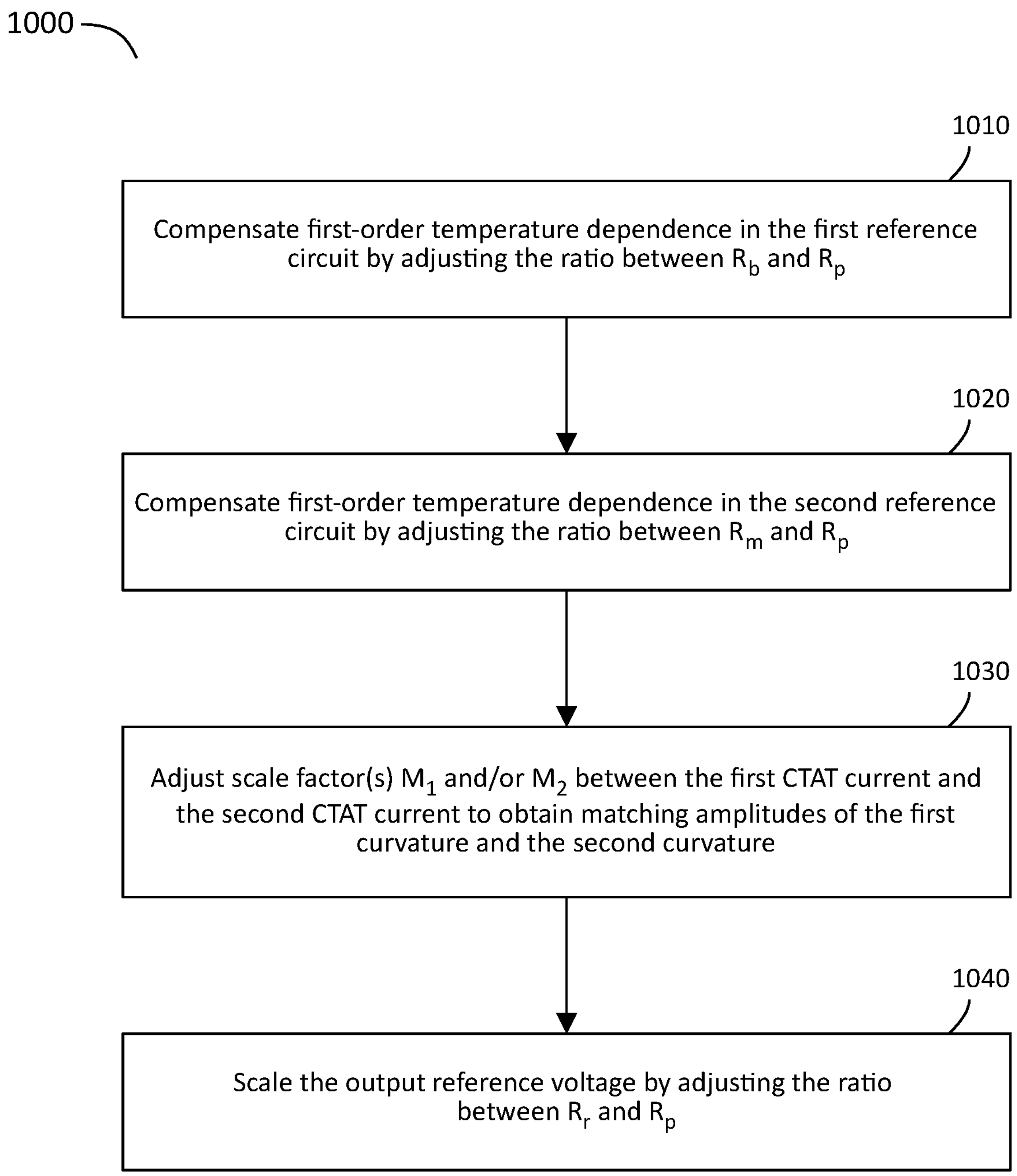
FIG. 10 – Method

CURVATURE-CORRECTED BANDGAP REFERENCE

BACKGROUND

Technical Field

The disclosed implementations relate generally to miscellaneous active electrical nonlinear devices, circuits, and systems, and in particular to those for determining voltages with a defined dependence on the temperature, such as bandgap references and temperature sensors.

Context

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The physical characteristics of electronic devices used in integrated circuits are generally dependent on the temperature. However, such dependence is invariably nonlinear. To design circuits that are linearly dependent on the temperature (or that are independent of the temperature) requires the use of devices whose nonlinearity is accurately known in combination with one or more compensation techniques. For example, the base-emitter voltage of a bipolar transistor decreases almost linearly with the temperature (see for example “Accurate Analysis of Temperature Effects in IC-VBE Characteristics with Application to Bandgap Reference Sources” by Yannis Tsividis, IEEE JSSC, vol. SC-15, pp. 1076-1084, December 1980). For a temperature sensor with a practical zero point, such as 0° F. or 0° C., it is possible to subtract the base-emitter voltage of a transistor from a PTAT (proportional to the absolute temperature), or Kelvin scale, voltage. For a bandgap reference, the base-emitter voltage can be added to a PTAT voltage. The PTAT voltage can be obtained from the difference between the base-emitter voltages of two transistors that are operated at different current densities. Various methods are known in the art. For increased linearity, a thermometer or bandgap reference needs not just first order correction, but also a second-order correction that adjusts for a small remaining curvature. To deal with statistical variations in a silicon production process, both thermometer and bandgap reference circuits may need trimming of one or more parameters.

Curvature-corrected bandgap references and thermometers have been described for many years. However, most corrections are not fully accurate, requiring an impractical third-order correction.

BRIEF DESCRIPTION OF THE DRAWINGS

The technology will be described with reference to the drawings.

FIG. 1 illustrates a block diagram of an implementation of a reference circuit.

FIG. 2 illustrates another implementation of a reference circuit.

FIG. 3 shows example current versus temperature curves of an implementation.

FIG. 4 shows an implementation of PTAT signal source with a startup circuit.

FIG. 5 shows an example implementation of the first reference source based on a bipolar junction transistor (BJT).

FIG. 6 shows another implementation of the first reference source based on a BJT.

FIG. 7 shows an implementation of the second reference circuit based on a metal-oxide-silicon (MOS) transistor in weak inversion mode.

FIG. 8 illustrates a complete circuit diagram of a voltage reference implementation.

FIG. 9 illustrates an example method of generating a reference voltage.

FIG. 10 illustrates an example method of calibrating a voltage reference.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope as claimed. Instead, they merely represent examples of different implementations of the disclosed technology.

DETAILED DESCRIPTION

The physical characteristics of electronic devices used in integrated circuits are generally dependent on the temperature. However, such dependence is invariably nonlinear. To design circuits that are linearly dependent on the temperature (or that are independent of the temperature) requires the use of devices whose nonlinearity is accurately known in combination with one or more compensation techniques.

Conventional designs of voltage or current reference circuits (jointly: bandgap references) and thermometer circuits have relied on using a Kelvin scale voltage or current (a PTAT voltage or current) and adding, respectively subtracting, a diode voltage, or current derived from a diode voltage. A diode voltage, or current derived from it, decreases approximately linearly with the temperature, although with a small curvature. Highly accurate bandgap references and thermometers need curvature correction. In both bipolar and MOS processes, circuits are well-known to generate PTAT and diode voltages. A few curvature correction techniques have been published, too.

This patent document discloses a novel technology for curvature correction, along with example implementations of bandgap references and temperature sensors. Generally, a bandgap reference adds a base-emitter voltage (VBE) of a BJT to a PTAT voltage to obtain a voltage that is independent of the temperature, whereas a temperature sensor subtracts a VBE from a PTAT voltage to obtain a voltage that is proportional to the temperature on for example the Fahrenheit or Celsius scale. Implementations may also target other output voltages that are linearly dependent on the temperature. Whereas some implementations add or subtract voltages, other implementations may add or subtract currents, for example a collector or emitter current of a BIT and a PTAT current.

Terminology

As used herein, the phrase “one of” should be interpreted to mean exactly one of the listed items. For example, the phrase “one of A, B, and C” should be interpreted to mean any of: only A, only B, or only C.

As used herein, the phrases "at least one of" and "one or more of" should be interpreted to mean one or more items. For example, the phrase "at least one of A, B, and C" or the phrase "at least one of A, B, or C" should be interpreted to mean any combination of A, B, and/or C.

Unless otherwise specified, the use of ordinal adjectives "first", "second", "third", etc., to describe an object, merely refers to different instances or classes of the object and does not imply any ranking or sequence.

The term "coupled" is used in an operational sense and is not limited to a direct or an indirect coupling. "Coupled to" is generally used in the sense of directly coupled, whereas "coupled with" is generally used in the sense of directly or indirectly coupled. "Coupled" in an electronic system may refer to a configuration that allows a flow of information, signals, data, or physical quantities such as electrons between two elements coupled to or coupled with each other. In some cases, the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term "connected" is used to indicate a direct connection, such as electrical, optical, electromagnetical, or mechanical, between the things that are connected, without any intervening things or devices.

The term "configured to" perform a task or tasks is a broad recitation of structure generally meaning "having circuitry that" performs the task or tasks during operation. As such, the described item can be configured to perform the task even when the unit/circuit/component is not currently on or active. In general, the circuitry that forms the structure corresponding to "configured to" may include hardware circuits, and may further be controlled by switches, fuses, bond wires, metal masks, firmware, and/or software. Similarly, various items may be described as performing a task or tasks, for convenience in the description. Such descriptions should be interpreted as including the phrase "configured to."

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an implementation in which A is determined based solely on B. The phrase "based on" is thus synonymous with the phrase "based at least in part on."

The terms "substantially", "close", approximately", "near", and "about" refer to being within minus or plus 10% of an indicated value, unless explicitly specified otherwise.

The following terms or acronyms used herein are defined at least in part as follows:

"BJT"—bipolar junction transistor.

"CTAT"—complementary to the absolute temperature scale. A CTAT current or voltage has a negative first-order temperature coefficient and thus decreases with the temperature.

"IC"—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

"MOS" transistor—metal-oxide-semiconductor transistor.

"PTAT"—proportional to the absolute temperature, or Kelvin scale. A PTAT current or voltage has a positive first-order temperature coefficient and thus increases with the absolute temperature. Its value, or extrapolated value, equals zero at zero degrees Kelvin.

"VBE"—the base-emitter voltage of a bipolar junction transistor. VBE is known to decrease almost linearly with the temperature, showing a slight curvature.

Implementations

FIG. 1 illustrates a block diagram of an implementation of a reference circuit 100. Reference circuit 100 includes a PTAT signal source 110, a first reference source 120 based on a BJT, a second reference circuit 130 based on a MOS transistor operated in weak inversion mode, and an output circuit 140. As drawn, reference circuit 100 is an example of a voltage reference that internally works with current signals, but, mutatis mutandis, other implementations may provide a current reference, or may internally work with voltage signals. Based on the circuits, principles, and methods described herein, it will become clear to a person of ordinary skill in the art how to design such other implementations.

In this example, PTAT signal source 110 generates one or more PTAT output currents that are based on an internal voltage, that may be derived from MOS transistor gate-source voltages by a PTAT reference resistor $R_p$. It may source, for example, a first PTAT current $I_{p1}$ and sink a second PTAT current $I_{p2}$. An example implementation of PTAT signal source 110 is described with reference to FIG. 4. Although PTAT signal source 110 is drawn with one output sourcing $I_{p1}$ and one output sinking $I_{p2}$, implementations may have any number of current sourcing outputs and any number of current sinking outputs to provide any number of copies of $I_{p1}$ and $I_{p2}$. In some implementations, Ip1 equals $I_{p2}$, whereas in other implementations they may be different. In implementations with multiple current source outputs, some of the outputs may deliver equal size output currents and other outputs may deliver different size output currents, for example scaled currents. In implementations with multiple current sink outputs, some of the outputs may sink equal size output currents and other outputs may sink different size output currents, for example scaled currents.

First reference source 120 generates a first reference current $I_{rb1}$ from a BJT base-emitter voltage $V_{be}$ using a first reference resistor $R_b$. Second reference circuit 130 uses a MOS transistor operating in weak inversion mode to generate a second reference current $I_{rm1}$ from the gate-source voltage $V_{gs}$ using a second reference resistor $R_m$. Both $V_{be}$ and $V_{gs}$ have CTAT first-order temperature dependence, and in this example both first reference source 120 and second reference circuit 130 add a PTAT current to compensate for this first-order temperature dependence, where the resistors $R_b$ and $R_m$ determine the respective ratios between the PTAT current and CTAT currents. The relations may be as follows:

$$I_{rb1}=M_1\times(I_{p1}+V_{be}/R_b)$$

$$I_{rm1}=M_2\times(I_{p2}+V_{gs}/R_m),$$

where $M_1$ and $M_2$ are scaling factors.

Both $V_{be}$ and $V_{rm}$ also exhibit curvatures when the temperature varies around a center temperature $T_0$, which can be designed to be, for example, room temperature. These curvatures are a second-order temperature dependence and known to be convex for $V_{be}$ and concave for $V_{gs}$ in weak inversion mode (see for example "A CMOS threshold voltage reference source for very-low-voltage applications" by Luis H. C. Ferreira et al., Microelectronics Journal 39 (2008), pp. 1867-1873 published by Elsevier). The curvatures in $V_{be}$ and $V_{rm}$ have opposite directions but may not have equal amplitudes. Either or both of the scale factors $M_1$ and $M_2$ can be used to scale the amplitudes to be equal in $I_{rb1}$ and $I_{rm1}$ to provide the desired curvature correction.

Output circuit 140 sums the reference currents $I_{rb1}$ and $I_{rm1}$ to produce reference current $I_r$ which is converted to the reference voltage $V_{REF}$ by resistor $R_r$.

$$I_r=I_{rb1}+I_{rm1}$$

$$V_{REF}=R_r\times I_r$$

$I_r$ is free of curvature when the curvatures in $I_{rb1}$ and $I_{rm1}$ cancel each other.

Whereas FIG. 1 depicts just signals between PTAT signal source 110, first reference source 120, and second reference circuit 130, in some applications PTAT signal source 110 also provides bias currents and/or bias voltages to first reference source 120 and second reference circuit 130.

FIG. 2 illustrates another implementation of a reference circuit. In the architecture of reference circuit 200, output circuit 240 sums a PTAT signal ($I_{rp2}$) delivered by PTAT signal source 210, a first CTAT signal ($I_{rb2}$) delivered by first reference source 220, and a second CTAT signal ($I_{rm2}$) delivered by second reference source 230. The signals may be currents, as drawn, or voltages. Output circuit 240 may deliver an output reference voltage $V_{REF}$, as drawn, or an output reference current. In the case drawn, output circuit 240 sums the PTAT current and the two CTAT currents to obtain an output reference current ($I_r$), which it converts to output reference voltage $V_{REF}$ using the output reference resistor $R_r$. The PTAT reference resistor $R_p$, the first reference resistor $R_b$, and the second reference resistor $R_m$ determine the sizes of the respective reference currents.

Whereas FIG. 2 depicts just signals between PTAT signal source 210 and output circuit 240, in some applications PTAT signal source 210 also provides bias currents and/or bias voltages to first reference source 220 and second reference source 230.

FIG. 3 shows example current versus temperature curves of an implementation. Graph 300 illustrates first reference current 324 ($I_{rb1}$) and unscaled reference current 326 ($I_{m1}$), as well as the output reference current 322 ($I_r=I_{REF}=I_{rb1}+M_1\times I_{m1}$), which results from scaling $I_m$ $M_1$ times and adding the result to $I_{rb1}$. The curvatures in first reference current 324 and unscaled reference current 326 are strongly exaggerated for illustrational purposes. As can be seen, $I_{m1}$ and $I_{rb1}$ may have a different first-order amplitude, and a different second-order amplitude (i.e., a different size of curvature). The scaling factor $M_1$ scales the curvatures to have equal size, and because they have opposite directions, they cancel in $I_{REF}$.

FIG. 4 shows an implementation of PTAT signal source 110 with a startup circuit. The circuit is well known in the art and many variations exist, all of which are within the scope and ambit of the disclosed technology. PTAT signal source 110 includes two current mirrors. The first current mirror includes the N-type transistors NM1 to NM5, and PTAT reference resistor $R_p$. NM3 to NM5 provide current sink outputs. PTAT signal source 110 may include fewer or more N-type transistors for fewer or more current sink outputs. Transistor NM1 is N times as large as NM2. Transistors NM3 to NM5 may have the same size as NM2 to sink currents $I_{p2}$ that have the same size as source current $I_{p1}$, or they may have a different size. In this example implementation, NM4 has twice the size of NM2 so that it sinks 2$I_{p2}$. The second current mirror includes the P-type transistors PM2, PM3, PM4, and PM5. PM5 provides a current source output.

Before first power-on, the capacitor C1 is empty, and the gates of NM1, NM2, and NM3 are at ground level. When VDD rises upon power-on, PM1 starts conducting which raises the voltage at the gates of NM1, NM2, and NM3 and starts the first current mirror. The current flowing in NM1 is mirrored by second current mirror PM2, PM3, PM4, and PM5. PM2 charges C, which switches off PM1. Since the currents through PM3 and PM4 are equal, the currents through NM1 and NM2 are equal too. But because the channel of NM1 is N times wider than the channel of NM2, the gate source voltages of NM1 and NM2 are unequal, creating a PTAT voltage $V_p$ over resistor $R_p$, resulting in a PTAT current $I_{p1}=I_{p2}=V_p/R_p$. By choosing the appropriate transistor sizes and currents flowing through them, NM1 and NM2 are designed to operate in weak inversion mode, resulting in a concave curvature. The PTAT voltage is $$V_p=V_{GS1}-V_{GS2}=\frac{kT\ \ln(N)}{q}$$

wherein k is the Boltzmann constant, q is the electron charge, and T is the absolute temperature.

FIG. 5 shows an example implementation of first reference source 120 based on a BJT. The first reference resistor $R_b$ has one terminal coupled with the base of NPN transistor QN (the BJT), and the other terminal coupled with the emitter of QN. Hence, the voltage over $R_b$ equals the base-emitter voltage $V_{be}$ of QN, and a current $I_{vbe}$ flows through $R_b$ that is proportional to the base-emitter voltage $V_{be}$, a CTAT voltage with convex curvature. The P-type transistors PM6 and PM7 form a current mirror, where PM7 provides a current source output for $I_{rb1}$. Transistor PM6 is the current mirror input, which receives current $I_{rb}$ that includes a PTAT component $I_{p2}$ from PTAT signal source 110 and the $I_{vbe}$ component. That current, along with the emitter current of QN is absorbed by current sink $I_{CQN}$, whose current is larger than $I_{p2}$, for example twice as large. The sizes of the transistors PM6 and PM7 in the current mirror may be equal for an unscaled version of $I_{rb1}$, or they may be unequal to provide for the scale factor $M_1$ that provides equal scaling of the first curvature and the second curvature.

The base current for transistor QN is also supplied by PM6, and it is mirrored in PM7 as an unwanted component of $I_{rb1}$. If QN is a vertical transistor it can have ample current amplification, and the base current may be in the order of a percent of its emitter current. As long as $I_{CQN}$ is not too much larger than $I_{p1}$, the base current has little impact on the overall temperature dependence of $I_{rb1}$. For example, in some implementations $I_{CQN}$ equals 2Ip1.

FIG. 6 shows another example first reference source 120 based on a BJT. The operation of this circuit is similar to the one in FIG. 5, mirrored with respect to the supply voltage (and with opposite types of transistors). The NPN transistor QN of FIG. 5 is replaced by PNP (P-type) transistor QP in FIG. 6. Again, first reference resistor $R_b$ has one terminal coupled with the base of QP (the BJT), and the other terminal coupled with the emitter of QP. This creates a current Iybe through $R_p$ that is proportional to the base-emitter voltage $V_{be}$, a CTAT voltage with convex curvature. P-type transistors PM6 and PM7 are replaced by N-type transistors NMD and NMO. To provide an output current source instead of a current sink, a second current mirror with transistors PMA and PMB is added, which outputs $I_{rb1}$. The sizes of the transistors PM in the output current mirror may be equal for an unscaled version of $I_{rb1}$, or they may be unequal to provide for the scale factor $M_1$ that provides equal scaling of the first curvature and the second curvature.

In both FIG. 5 and FIG. 6, the balance between $I_{vbe}$ and $I_{p2}$ or $I_{p1}$ is determined by the size of first reference resistor $R_b$. Manufacturing process tolerances impact the exact size of $V_{be}$, and therefore the accuracy of the cancellation of first-order temperature effects (PTAT versus CTAT) in first reference source 120 or in output circuit 240. Trimming of first reference resistor $R_b$ as part of a production test procedure restores the accuracy.

FIG. 7 shows an implementation of second reference circuit 130 based on a MOS transistor. MOS-based current references are well known in the art, and many variations exist, each of which is within the scope and ambit of the disclosed technology. However, in the technology disclosed herein, MOS transistor NM6 is designed to operate in weak inversion mode by choosing an appropriate current density, determined by its size and the value of its drain-source current, which equals PTAT current $I_{p1}$. Its gate-to-source voltage $V_{gs}$ has a negative temperature coefficient (CTAT first-order temperature dependence) and shows a concave curvature. The gate-to-source voltage $V_{gs}$ produces a CTAT current $I_{vgs}$ through second reference resistor $R_m$, NM7, and PM8. Current mirror PM8 and PM9 adds the PTAT current $I_{p2}$. The balance between CTAT current $I_{vgs}$ and PTAT current $I_{p2}$ is determined by the size of second reference resistor $R_m$. Manufacturing process tolerances impact the exact size of $V_{gs}$, and therefore the accuracy of the cancellation of first-order temperature effects (PTAT versus CTAT) in second reference circuit 130. Trimming of second reference resistor $R_m$ as part of the production test procedure restores the accuracy.

Current mirror PM8 and PM9 scales its input current $I_{m1}$ with scale factor $M_2$ to produce the output current $I_{rm1}$ at the drain of PM9. Thus, transistor PM9 outputs the scaled reference current $I_{rm1}=M_2\times(I_{vgs}+I_{p2})$.

As noted earlier in this document, the scale factors $M_1$ and $M_2$ can be used to scale $I_{rm1}$ versus $I_{rb1}$ to obtain equal-sized but opposite-direction curvatures. However, the scaling does not need to happen in the current mirror PM8 and PM9 in second reference circuit 130. Many other ways of scaling are possible and clear to a person skilled in the art. For example, in an implementation PM8 and PM9 in second reference circuit 130 may have equal sizes, but PM6 in first reference source 120 may be $M_2$ times larger than PM7, so that first reference current $I_{rb1}$ is a fraction $1/M_2$ of its components $I_{p2}$ and $I_{vbe}$.

The resulting reference voltage $V_{REF}$ in output circuit 140 includes a component $V_{REFb1}=I_{rb1}\times R_r$ and a component $V_{REFm1}=I_{rm1}\times R_r$, or the resulting reference voltage $V_{REF}$ in output circuit 240 includes a component $V_{REFb2}=I_{rb2}\times R_r$ and a component $V_{REFm2}=I_{rm2}\times R_r$. Assuming that $R_b$ and $R_m$ are properly sized versus $R_p$, both components are first-order temperature compensated and show no PTAT or CTAT behavior. However, $V_{REFb1}$ and $V_{REFb2}$ show a convex curvature and $V_{REFm1}$ and $V_{REFm2}$ shows a concave curvature. The curvatures are in the form $$V_{REFb1}=\frac{R_r}{R_b}E_{g0}+k_b\times f(T),\text{ and}$$

$$V_{REFm1}=M\frac{R_r}{R_m}\frac{n}{2}E_{g0}-M\times k_m\times f(T),\text{ where}$$

$$f(T)=\frac{T}{T_0}\left(1-\ln\left(\frac{T}{T_0}\right)\right),$$

$E_{g0}$ is the bandgap voltage of the semiconductor (e.g., silicon),

M is the combined scaling of the scale factors $M_1$ and $M_2$, and n is the slope factor of a MOS transistor in weak inversion.

The terms $k_b$ and $k_m$ are the amplitudes of the respective curvatures. The amplitudes of the curvatures are equal when $$M=k_bR_m/k_mR_b$$

FIG. 8 illustrates a complete circuit diagram of a voltage reference 800 implementation. Voltage reference 800 combines the circuits described with reference to FIGS. 1, 4, 5, and 7. Transistors PM1, PM2, and capacitor C1 are the power-on reset that starts the PTAT generator NM1, NM2, $R_p$, and PM3-5, as described with reference to FIG. 4. NM1 and NM2 are matched transistors with a size ratio of N. They are designed to operate in weak inversion. The current source output is on the drain of PM5, which outputs a copy of $I_{p1}$. Current mirror outputs NM3-5 sink copies $I_{p2}$ at their drains.

In an integrated implementation of a reference circuit like the voltage reference of FIG. 8, it is important that key devices have the same temperature. Key devices include NM1, QN, PTAT reference resistor $R_p$, first reference resistor $R_b$, second reference resistor $R_m$, and output reference resistor $R_r$. A person with ordinary skill in the art will know that these devices need to be laid out close to each other, and in configurations that cancel temperature gradients on the chip surface. The resistors may need to be relatively large in size to ensure sufficient matching of their resistance values, and the resistors may need to be trimmable to enable calibration of the reference circuit, for example during a production test.

FIG. 9 illustrates an example method 900 of generating the reference voltage. Method 900 comprises:

Step 910—in a current source, generating a PTAT current that is based on a PTAT reference resistor $R_p$ value.

Step 920—in a first reference current source, generating a first CTAT current that is based on a base-emitter voltage of a bipolar junction transistor (BJT) and on a first reference resistor $R_p$ value. The first CTAT current has a first curvature component with a convex shape.

Step 930—in a second reference current circuit, generating a second CTAT current that is based on a gate-source voltage of a MOS transistor operated in weak inversion mode and on a second reference resistor $R_m$ value. The second CTAT current has a second curvature component with a concave shape.

Step 940—scaling the first CTAT current and/or the second CTAT current. This scales the first curvature component and/or scaling the second curvature component and obtains a match of the amplitudes of the first curvature component and the second curvature component.

Step 950—adding a copy of the PTAT current, the first CTAT current, and the second CTAT current to obtain an output reference current.

Step 960—converting the output reference current to the reference voltage using an output reference resistor $R_r$.

FIG. 10 illustrates an example method 1000 of calibrating a voltage reference. Method 1000 may be performed during a production test, or at another time, and comprises:

Step 1010—in a first reference current circuit, compensating a first-order temperature dependence in a first CTAT current by adjusting a first resistor value ratio of a first reference resistor $R_b$ value and a PTAT reference resistor $R_p$ value.

Step 1020—in a second reference current circuit, compensating a first-order temperature dependence in a second CTAT current by adjusting a second resistor value ratio of a second reference resistor $R_m$ value and the PTAT reference resistor $R_p$ value.

Step 1030—(optional) adjusting a scale factor M between the first CTAT current and the second CTAT current to obtain a match of an amplitude of a first curvature component with an amplitude of a second curvature component. The scale factor M may be a combination $M=M_1 \times M_2$ of scale factors $M_1$ and $M_2$ of the first reference current circuit and the second reference current circuit. This step is optional and may be performed during a production test, or it may be designed into an integrated circuit, for example after measurements on an engineering prototype. In that case, the scale factors are hard-wired in the current mirrors in the first reference current circuit and/or the second reference current circuit.

Step 1040—scaling an output reference voltage by adjusting a third resistor value ratio of an output reference resistor $R_r$ value and the PTAT reference resistor $R_p$ value.

Considerations

Although the description has been described with respect to specific implementations thereof, these specific implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to specific implementations thereof, these specific implementations are merely illustrative, and not restrictive. For instance, many of the operations can be implemented on a printed circuit board (PCB) using off-the-shelf devices, in a System-on-Chip (SoC), application-specific integrated circuit (ASIC), programmable processor, a coarse-grained reconfigurable architecture (CGRA), or in a programmable logic device such as a field-programmable gate array (FPGA), obviating the need for at least part of any dedicated hardware. Implementations may be as a single chip, or as a multi-chip module (MCM) packaging multiple semiconductor dies in a single package. All such variations and modifications are to be considered within the ambit of the disclosed technology the nature of which is to be determined from the foregoing description.

Any suitable technology for manufacturing electronic devices can be used to implement the circuits of specific implementations, including CMOS, FinFET, GAAFET, BICMOS, bipolar, JFET, MOS, NMOS, PMOS, HBT, MESFET, etc. Different semiconductor materials can be employed, such as silicon, germanium, SiGe, GaAs, InP, GaN, SiC, graphene, etc. Circuits may have single-ended or differential inputs, and single-ended or differential outputs. Terminals to circuits may function as inputs, outputs, both, or be in a high-impedance state, or they may function to receive supply power, a ground reference, a reference voltage, a reference current, or other. Although the physical processing of signals may be presented in a specific order, this order may be changed in different specific implementations. In some specific implementations, multiple elements, devices, or circuits shown as sequential in this specification can be operating in parallel.

It will also be appreciated that one or more of the elements depicted in the drawings/figures can also be implemented in a more separated or integrated manner, or even removed or rendered as inoperable in certain cases, as is useful in accordance with a particular application.

Thus, while specific implementations have been described herein, latitudes of modification, various changes, and substitutions are intended in the foregoing disclosures, and it will be appreciated that in some instances some features of specific implementations will be employed without a corresponding use of other features without departing from the scope and spirit as set forth. Therefore, many modifications may be made to adapt a particular situation or material to the essential scope and spirit.

What is claimed is:

1. A reference circuit, comprising:

a PTAT signal source that generates one or more output signals that are proportional to an absolute temperature (PTAT output signals);

a first reference source, with a first output signal that is based on a base-emitter voltage of a bipolar junction transistor (a BJT), wherein a curvature of the base-emitter voltage of the BJT has a convex temperature dependence, and wherein the first reference source comprises:

a first reference resistor $R_b$; and the BJT, and wherein the BJT has a base coupled with a first terminal of the first reference resistor $R_b$ and an emitter coupled with a second terminal of the first reference resistor $R_b$;

a second reference source, with a second output signal that is based on a gate-source voltage of a metal-oxide-semiconductor transistor (a MOS transistor) operating in weak inversion mode, wherein the MOS transistor operates in the weak inversion mode when the gate-source voltage applied to the MOS transistor is lower than a threshold voltage of the MOS transistor and wherein a curvature of a voltage of the MOS transistor when operated in the weak inversion mode has a concave temperature dependence; and an output circuit coupled with outputs of the first reference source and the second reference source, and that adds the first output signal and the second output signal to obtain a reference circuit output signal that has a curvature-corrected linear dependence on a temperature;

wherein the one or more output signals, the first output signal, and the second output signal are currents derived using a PTAT reference resistor $R_p$, the first reference resistor $R_b$, and a second reference resistor $R_m$, respectively, and wherein the reference circuit output signal is a reference voltage $V_{REF}$ derived using an output reference resistor $R_r$.

2. The reference circuit of claim 1, wherein the PTAT signal source delivers a first PTAT output signal to the first reference source and a second PTAT output signal to the second reference source.

3. The reference circuit of claim 1, wherein the PTAT signal source delivers a PTAT output signal to the output circuit.

4. The reference circuit of claim 1, wherein the second reference source comprises:

the second reference resistor $R_m$; and the MOS transistor, and wherein the MOS transistor has a gate coupled with a first terminal of the second reference resistor $R_m$, and a source coupled with a second terminal of the second reference resistor $R_m$.

5. The reference circuit of claim 1, wherein:

the PTAT signal source provides one or more bias signals for the first reference source and for the second reference source.

6. A method of generating a reference voltage, comprising:

in a current source, generating a current that is proportional to an absolute temperature (a PTAT current) and based on a PTAT reference resistor $R_p$ value;

in a first reference current source, generating a first current that is complementary to the absolute temperature (a first CTAT current) and based on a base-emitter voltage of a bipolar junction transistor (BJT) and on a value of a first reference resistor $R_b$, and wherein the first CTAT current includes a first curvature component with a convex shape, and wherein the first reference current source comprises the first reference resistor $R_b$ and the BJT, and wherein the BJT has a base coupled with a first terminal of the first reference resistor $R_b$ and an emitter coupled with a second terminal of the first reference resistor $R_b$;

in a second reference current circuit, generating a second CTAT current that is based on a gate-source voltage of a metal-oxide-semiconductor (MOS) transistor operated in weak inversion mode and on a second reference resistor $R_m$ value, wherein the MOS transistor operates in the weak inversion mode when the gate-source voltage applied to the MOS transistor is lower than a threshold voltage of the MOS transistor and wherein a curvature of a voltage of the MOS transistor when operated in the weak inversion mode has a concave temperature dependence, and wherein the second CTAT current includes a second curvature component with a concave shape;

adding a copy of the PTAT current, the first CTAT current, and the second CTAT current to obtain an output reference current; and converting the output reference current to the reference voltage using an output reference resistor $R_r$;

wherein an output signal of the current source, a first output signal of the first reference current source, and a second output signal of the second reference current circuit are currents derived using a PTAT reference resistor $R_p$, the first reference resistor $R_b$, and a second reference resistor $R_m$, respectively, and wherein a reference circuit output signal is the reference voltage derived using the output reference resistor $R_r$.

7. The method of claim 6, wherein adding a copy of the PTAT current includes adding a first copy of the PTAT current to the first CTAT current and adding a second copy of the PTAT current to the second CTAT current.

8. The method of claim 6, further comprising:

scaling the first CTAT current and/or the second CTAT current, wherein scaling the first CTAT current and/or the second CTAT current includes scaling the first curvature component and/or scaling the second curvature component to obtain a match of an amplitude of the first curvature component with an amplitude of the second curvature component.

* * * * *